United States Patent [19]
Ovanin

[11] 3,945,275
[45] Mar. 23, 1976

[54] ROTARY JAW CHUCK WITH STOCK DETECTOR

[75] Inventor: George J. Ovanin, Euclid, Ohio

[73] Assignee: The S-P Manufacturing Corporation, Solon, Ohio

[22] Filed: Feb. 1, 1974

[21] Appl. No.: 438,683

[52] U.S. Cl. ............... 82/40 R; 279/1 R; 279/4; 82/30
[51] Int. Cl.² ............... B23B 33/00; B23B 31/30
[58] Field of Search ........... 82/30, 40 A, 40 R, 2.5; 408/6, 7; 279/1 R, 4

[56] References Cited
UNITED STATES PATENTS

| | | | |
|---|---|---|---|
| 2,625,061 | 1/1953 | Mansfield | 408/7 |
| 3,200,680 | 8/1965 | Coffin | 82/2.5 |
| 3,373,641 | 3/1968 | Hermann | 82/40 |

Primary Examiner—Leonidas Vlachos
Attorney, Agent, or Firm—Watts, Hoffmann, Fisher & Heinke Co.

[57] ABSTRACT

A rotary jaw chuck work holder for a machine tool or the like, with a central opening through which stock is fed and a detector sensitive to the presence of sufficient stock for safe gripping by the chuck jaws beyond the opening. A rod is movable by air pressure in a passage of the chuck that communicates with the central opening. The extent to which the rod moves depends upon the presence or absence of a workpiece in the central opening. Air is supplied to the rod passage of the work holder through an annular manifold part of which is movable into contact with the work holder in response to air flow to the manifold. When moved against the work holder, the manifold supplies air to the rod passage without regard to the rotational position of the work holder. In the absence of sufficient stock, the air pressure will move the rod to a position that vents the rod passage, causing a loss in pressure that is sensed by a pressure responsive switch in a control circuit, which then prevents operation of the machine that rotates the work holder.

10 Claims, 3 Drawing Figures

ROTARY JAW CHUCK WITH STOCK DETECTOR

BACKGROUND OF THE INVENTION

This invention relates to a rotary jaw chuck for machine tools or the like with a detector for determining the presence of stock.

In machining operations involving bar stock or the like, the bar is typically fed through a work holder from one side so as to extend from the other side or end of the work holder, where the stock is machined. The feeding is done in steps, automatically, and the workpiece is gripped after each step or advance, rotated and machined. The work holder is required to hold and rotate the workpiece against the force developed during cutting or machining and adequate gripping depends upon sufficient bar stock remaining within the work holder after each advance. Thus, it becomes necessary to detect when the bar has become too short to be advanced and safely gripped to machine an additional part.

Detectors for determining the presence of stock for gripping are known, but have typically been mechanically complex or have required rotary joints or slip rings to bridge a connection between the rotary holder and a sationary detector and control, if the detectors are electrically or air operated. In certain collet type work holders the above problems have been circumvented with a detector sensitive to air pressure in a conduit of the work holder within which a stock detecting sensor moves to detect the presence of work gripped internally of the chuck body. In such an arrangement air is supplied from a stationary source when the work holder is stopped and pressure builds up in the supply passage if a workpiece blocks movement of the sensor. The pressure build up is sensed and permits continued operation.

It will be appreciated that detectors for present purposes must be rugged and simple enough to function under machining conditions, i.e., in the presence of chips, coolant, vibration, heat, and the like. They must also be reliable because of the safety hazard created when a workpiece is inadequately gripped. Where the stock is gripped beyond the chuck body, as in a jaw chuck, arranging a satisfactory location of and construction for the detector without interfering with the operating mechanisms and without wasting undue lengths of stock which could be adequately gripped becomes a problem.

SUMMARY OF THE INVENTION

The present invention provides in a jaw chuck a reliable bar stock detector that operates simply and effectively. In its preferred form, it utilizes fluid pressure in sensing and signalling the presence or absence of stock in a central opening of the chuck closely adjacent the jaws, yet eliminates any need for rotary joints or seals and avoids interfering with the jaw operating mechanisms. Further, the detector is effective for a variety of bar diameters without adjustment, and can be incorporated into existing work holder designs with a minimum of modifications.

The invention is embodied in a jaw chuck type work holder with a central opening through which the work, such as bar stock, passes. The chuck is rotatably supported on a machine tool spindle. Work gripping jaws of the chuck grip the stock after is is advanced through the chuck so that the stock rotates with the chuck during a machining operation. A chuck of this type is shown in the copending application of George J. Ovanin, Ser. No. 371,367, filed June 19, 1973, entitled "Self Centering and Compensating Chuck".

Basically, the present invention provides (1) a member carried with a jaw chuck and movable in the absence of a workpiece into a location normally occupied by a workpiece of adequate size when the workpiece is gripped by the jaws, and (2) non-rotated means associated with the machine tool, sensitive to the position of the movable member carried by the chuck, for controlling rotation in response to the position of the movable member. In the preferred embodiment, a fluid passage is provided in a segment of the chuck body between adjacent jaws, with a vent, and the movable member is within the fluid passage. The extent of movement of the member is dependent upon the presence of a portion of the workpiece in the central opening and the position of the member in the fluid passage controls the pressure in the passage by selectively blocking or opening the vent. Hence, the pressure in the passage is indicative of the presence or absence of the workpiece, and in a preferred embodiment a build up of pressure indicative of the presence of a workpiece operates a pressure-sensitive switch in a contol circuit of the machine tool that permits rotation of the chuck. Conversely, when the passage is vented indicating the absence of a workpiece, rotation is prevented. Ideally, movement of the member is directly blocked by the workpiece in the central opening and the member itself isolates or blocks the vent controlling the pressure. Preferably, the member is moved into a sensing position relative to the workpiece in responsive to the supply of fluid to the passage and the buildup of pressure by that fluid operates the pressure switch of the control circuit.

Structurally, the fluid passage is located closely adjacent a front face of the chuck, in which master jaws carrying the work-gripping jaws are slidable. The passage opens into the central opening closely adjacent to where the jaws grip the workpiece and is located where it will not interfere with the jaw operating mechanisms, yet is located internally of the chuck body.

Fluid pressure is made available to the passage in the chuck through a port in the external surface, which most conveniently is in a rearward transverse face. Communication from a source of fluid under pressure to the port of the passage is established when rotation of the chuck is stopped and is independent of the rotational position of the chuck. To this end, an annular manifold is utilized that forms a continuous ring of pressure about a circular zone that can communicate with the port of the fluid passage in the chuck. A part of the manifold that directly receives fluid is stationary and a part is movable toward and away from contact with the chuck when the chuck is stationary. In a preferred embodiment, such movement is in response to the application of the fluid pressure to the manifold. Thus, the flow of fluid under pressure at a stationary location of the machine tool establishes communication with the rotatable jaw chuck and then flows into the chuck passage to determine the presence of a workpiece and control rotation.

Accordingly, it is an object of this invention to provide a stock detector system in a jaw chuck, which is rugged and reliable, simple in operation, which avoids interference with the operation of the chuck jaws, which senses the workpiece close to the external jaws, and which requires minimal modifications to existing jaw chucks for incorporation.

The above and other features, advantages and objects of this invention will become more apparent as the invention is better understood from the detailed description that follows.

DESCRIPTION OF A PREFERRED EMBODIMENT

Figure 1:
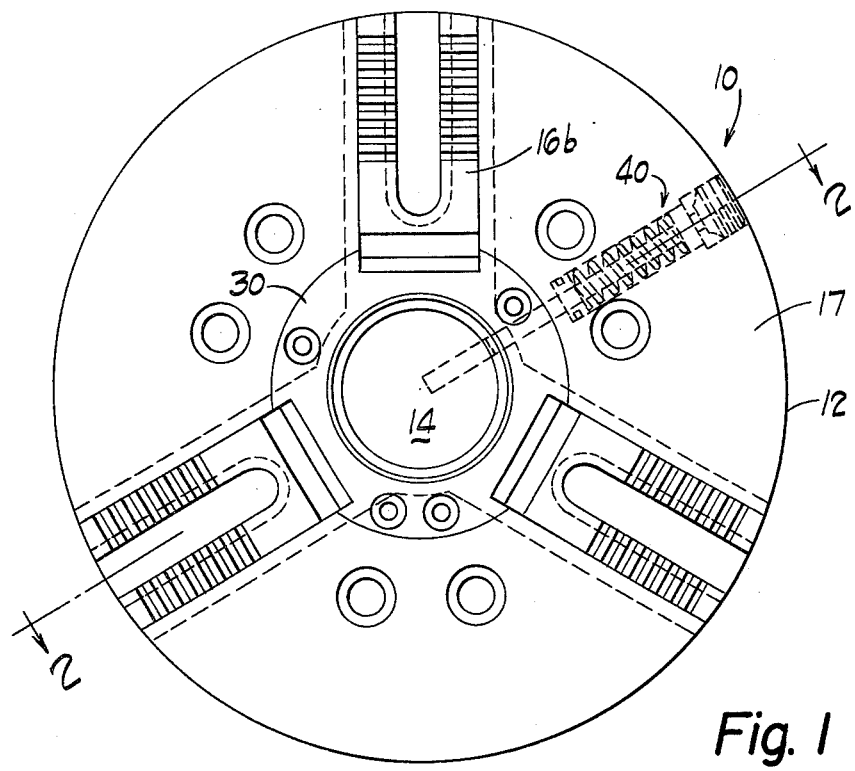
FIG. 1 is a front elevational view of a rotary jaw chuck incorporating the present invention.

With reference now to the drawings, the invention is embodied in a jaw chuck 10 with a central opening and self centering action, especially useful for machining bar stock or the like.

The chuck 10 has a cylindrical body 12 with a central opening 14 extending axially through the body, three work gripping and centering jaws 16 adjacent a front face 17 of the body, and a backplate or adaptor 18 on the back face, supporting the body on a rotary spindle 20 of a machine tool. The jaws 16 include work gripping portions 16a and master portions 16b slidable in ways in the front surface, operated from a draw tube 24 that extends through the backplate 18 and through the spindle 20 of the machine tool. The workpiece, such as a bar W, extends through the draw tube and spindle of the machine tool, forwardly of the front face of the body 12 of the chuck, where it is gripped by the jaw portions 16a. The draw tube is attached to a tubular cam operator 26 that is secured to an annular cam 28 within the chuck body. The cam is guided by a dust bushing 30 extending inwardly from the front face 17 of the chuck body, through which the work passes. The particular construction shown is adapted to permit conversion of the chuck to a compensating type action, but that feature does not form a part of and is not utilized in the present invention, and is more particularly disclosed and claimed in the copending application Ser. No. 371,367, filed June 19, 1973, the disclosure of which is hereby incorporated by reference.

Axial movement of the cam 28 by the draw tube rocks radial levers 32 within the chuck body, pivoted on pins 34. The levers, which enter the master jaws 16b, move the jaws 16b and the work gripping jaws 16a radially when the draw tube is actuated to grip bar work W fed through the central opening 14 from the back of the work holder.

Figure 3:
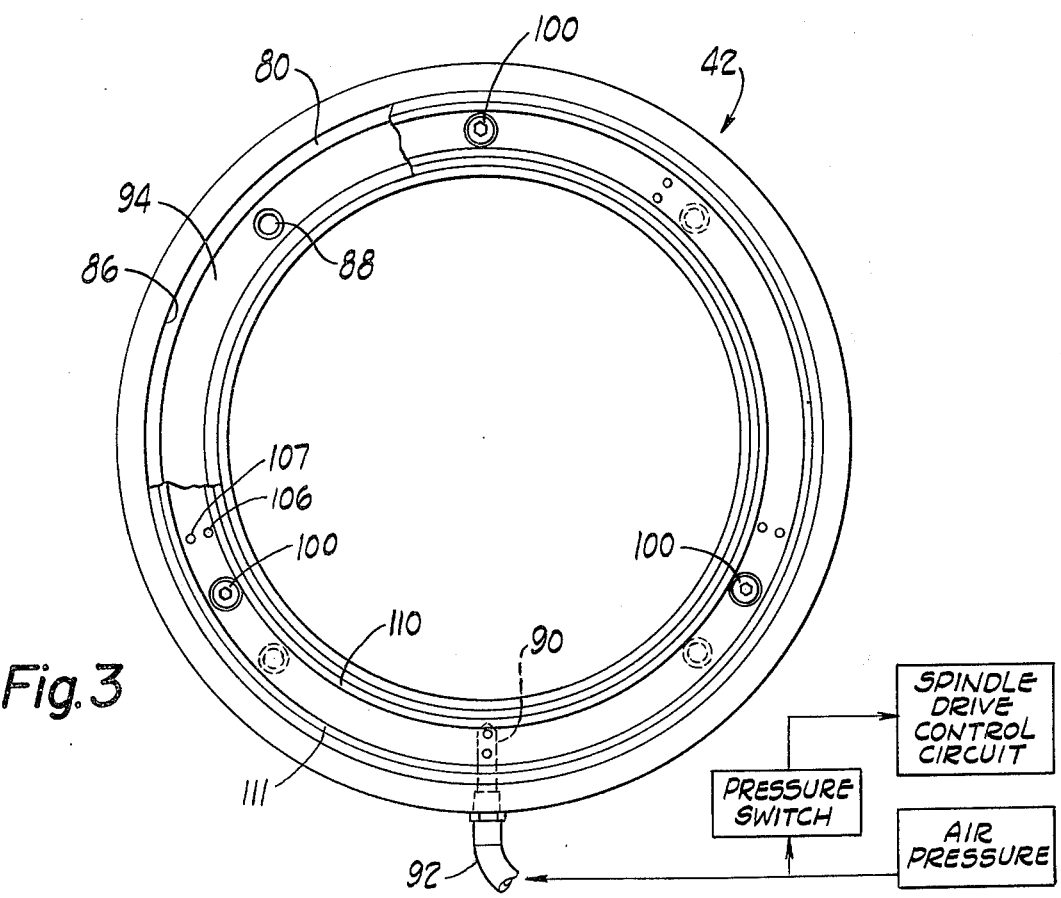
FIG. 3 is an elevational view taken from the plane of line 3—3 of FIG. 2 showing the non-rotative structive carried by the machine tool or other work holder driving mechanism and showing a block diagram of an associated machine tool control.

A stock detector 40 is carried in the chuck body 12 and an associated assembly 42, which functions as an actuator for the stock detector and as part of a sensing mechanism, is carried by the machine tool. The assembly 42 is rotationally stationary but in part is axially movable relative to the chuck body 12. The assembly 42 and the stock detector 40 together serve to detect the presence or absence of bar stock within the central opening 14 of the chuck body and control operation of the machine tool each time the bar stock forming the workpiece is advanced, so that the machine tool can be controlled to not operate if there is insufficient stock to be securely gripped. With the spindle stopped, the assembly 42 serves to supply air under pressure to the stock detector 40, which either blocks or vents the pressure and flow depending upon whether or not stock is present at a particular location within the central opening 14. A control circuit (FIG. 3) association with the machine tool and sensitive to the pressure in the associated assembly 42, then prevents or allows rotation of the spindle.

Figure 2:
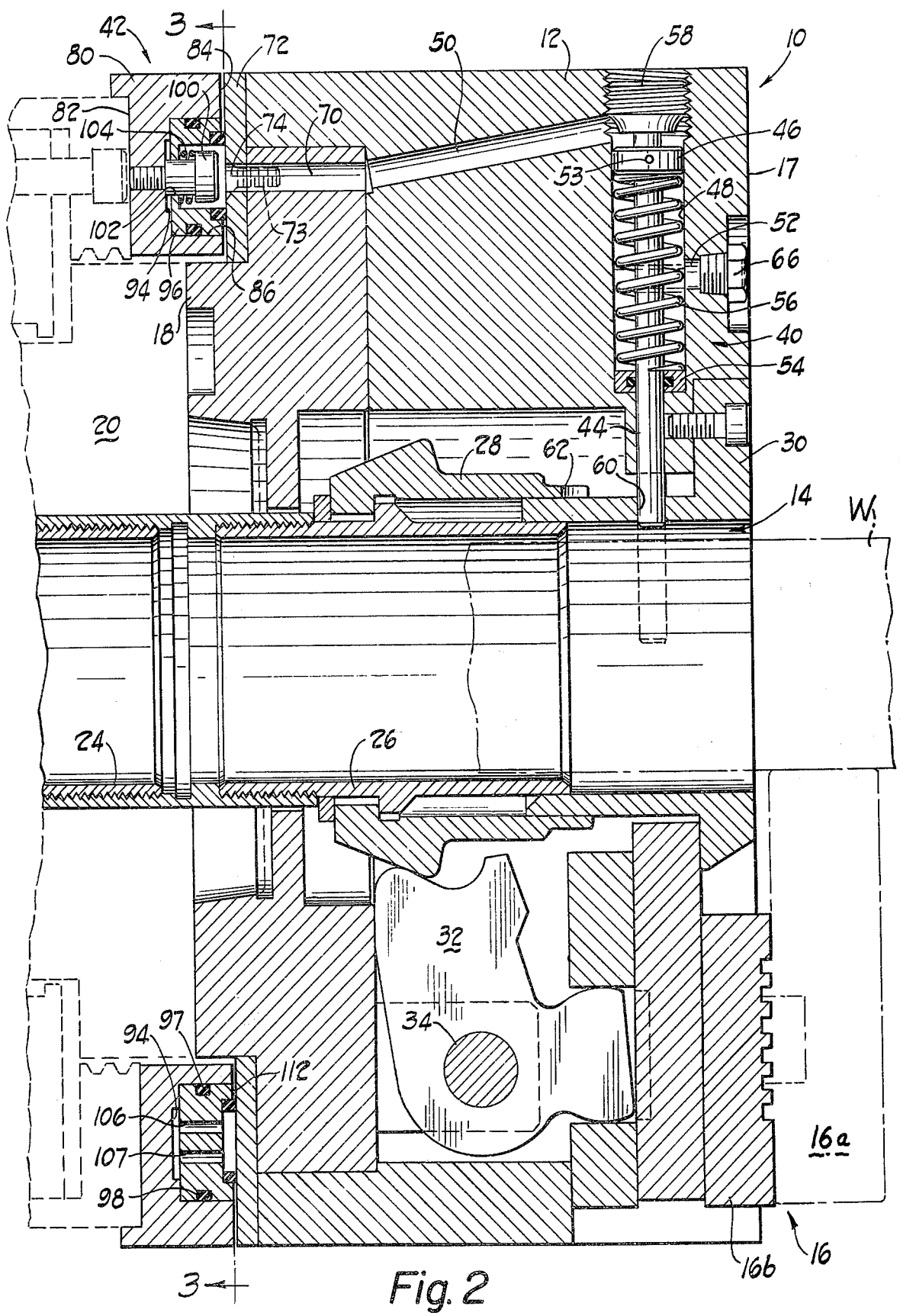
FIG. 2 is a sectional view taken along the line 2—2 of FIG. 1.

The stock detector 40 includes a slidable pin 44 with an attached collar 46 that acts as a piston. Both are received in a radial bore 48 of the chuck body 12 and are movable in response to a flow of air under pressure supplied through a passage 50 to the end of the bore 48. As shown in FIGS. 1 and 2, the radial bore 48 is located in a segment of the chuck between adjacent jaws 16 and closely adjacent the front face 17. A workpiece W in the central opening 14 of the chuck body will block movement of the pin 44, as long as a portion of the workpiece extends a short distance behind the front face and will prevent the piston 46 from moving past a vent 52 in the bore 48. Pressure in the bore on the supply side of the piston then serves as an indication of the presence of a workpiece within the central opening of the chuck body, adjacent the location where the pin 44 extends into the central opening. As long as bar stock is present at that location there is adequate stock for gripping and excess stock beyond that required for safe gripping need not be present to obstruct the pin 44 and hence stock waste is minimized.

The piston-forming collar 46 is suitably secured adjacent the end of the pin 44, as by a small screw 53. The pin is guided both by the piston 46 and a bearing surface formed by an opening 60 in the dust bushing 30 through which the pin slides. The pin and piston are biased radially outwardly by a compression spring 56 that surrounds the pin and acts between a seal 54 and the piston 46. The bore 48 is closed at the outer end by a plug 58. The pin 44 is movable into the central opening 14 of the chuck body through the opening 60. The actuating cam 28 is also cut away at 62, to facilitate movement axially, without obstructing radial movement of the pin 44. The vent passage 52 communicates between the passage or bore 48, and the front face of the chuck body. A vented plug 66 at the front face prevents the entrance of foreign material. The vent is located at a point of the passage that the piston 46 will pass only after the pin 44 moves radially inwardly of the chuck body, beyond the surface or location of the smallest diameter workpiece to be gripped by the work holder.

The air supply passage 50 to the outer end of the radial bore 48 that extends generally in an axial direction of the chuck body, and opens through the back surface, is aligned with a passage 70 in the backplate 18. An annular sealing plate 72 is secured to the backplate 18 by screws 73 and has an aperture 74 aligned with the passage 70. The annular sealing plate 72 provides a flat radial face against which a movable portion 96 of the assembly can seat, to supply air under pressure to the passage 50.

The assembly 42 has a housing ring 80 with a rear surface 82 facing the machine tool, and a front surface 84 with an annular chamber 86 facing the chuck or work holder 10. The housing ring 80 is secured to the machine tool by screws 88 (FIG. 3) and is located with the front surface 84 close to but spaced from the outer surface of the plate 72 on the chuck body. In a preferred embodiment, the spacing is approximately 0.020 inch. A passage 90 from the outer peripheral surface of the housing ring 80 to the annular chamber 86 serves as a supply conduit for air from a source indicated by the conduit 92, to the annular chamber 86. An annular recess 94, smaller in depth and width than the chamber 86, is provided at the base of the chamber and directly communicates with the passage 90.

An annular piston 96 is closely received in the chamber 86 and is slidable axially of the chuck body. O-ring seals 97, 98 in the inner and outer peripheral surfaces of the annular piston serve to provide an air-tight sliding seal between the piston and the housing ring 80. The annular piston 96 is secured for axial movement but maintained in an assembled relationship with the housing ring 80, by three screws 100 in bores 102 of the piston, the screws serving to guide the piston in axial movement. Springs 104 surrounding each screw 100 bias the piston into the chamber 86. Five sets of double holes 106, 107 extend axially through the piston, providing air passages from the chamber 86 through the piston to a zone adjacent the seal plate 72. Two spaced seal rings 110, 111 extend from the front face 112 of the piston 96, adjacent the seal plate 72. These rings are preferably of Teflon to provide a good seal, and are concentric, being spaced apart in the plane of the face 112, a distance greater than the diameter of the opening 74 in the sealing plate 72 and located to lie on opposite sides of the opening, considered in a radial direction from the center of the chuck body.

In operation, when air pressure is introduced through the passage 90 into the annular recess 94, it will provide pressure against the opposed inner face of the piston 96. Sufficient air pressure is provided to overcome the bias of the springs 104 and the pressure will then drive the annular piston toward the chuck body, away from the recess 94. The seal rings 110, 111 will then seat against the outer face of the seal plate 72 to form an annular plenum of air fed through the holes 106, 107, the plenum being in direct communication with the opening 74. The area of the holes 106, 107 is small enough so that adequate pressure will be maintained behind the annular piston to maintain it in an extended position against the seal plate 72. The air flow through the assembly 42 is thus received by the passage 50 in the chuck body, regardless of the rotational location of the passage.

Air is supplied through the passage 90 to drive the piston outward into contact with the chuck body only when the rotation of the work holder is stopped and after the workpiece has been advanced within the central aperture 14 of the chuck body. The air pressure so supplied to the passage 50 drives the piston 46 and the connected pin 44 toward the center of the chuck body. If a workpiece is adjacent the aperture 60 at the central passage of the chuck body, indicating the presence of adequate stock, the pin is stopped, with the piston in a location radially outwardly of the vent passage 50, and in the housing ring and supply passage 90. This pressure buildup in the passage 90 is detected by a pressure operated switch in the air supply. The pressure operated switch is connected electrically to the control circuit of the machine tool, so that the machine tool will not begin rotation of the work holder, as by driving the spindle, until the pressure switch has been tripped by a buildup of pressure in the passage 90 and conduit 92. Thus, the next cycle of operation and rotation of the work holder can begin only if the pin 44 is obstructed by work in the central passage of the work holder. If the workpiece is not of sufficient length to obstruct the inward movement of the pin, the pin moves centrally until the piston 46 passes the vent passage 52, allowing the flow of air in the passage 48 to escape and preventing buildup of pressure through the system, and into the supply passage 90 and conduit 92. As a result, the pressure switch in the control circuit will not be actuated and a subsequent cycle of the machine tool cannot be initiated.

While a preferred embodiment of the invention has been described in detail, it will be understood that various modifications or alterations can be made therein without departing from the spirit and scope of the invention set forth in the appended claims.

I claim:

1. A rotary work holder comprising a chuck body adapted to be rotatably driven, a central opening through the body for receiving a portion of workpiece and through which the workpiece can be fed, a movable jaw carried by the chuck body adjacent a front face and movable relative to the chuck body to grip the workpiece beyond said opening, means within the chuck body about said opening movable relative to the body for actuating said jaw, a member movable in the absence of a workpiece into said central opening at a location normally occupied by a workpiece gripped by the jaw, and means, with respect to which the chuck body is rotatable, sensitive to the position of said member in said central opening, to selectively permit or prevent work holder 2. A work holder as set forth in claim 1 wherein said means to prevent work holder rotation includes a control circuit and switch, arranged to prevent work holder rotation when said member is in said location.

3. A rotary work holder comprising a chuck body adapted to be rotatably driven, a central opening in the body for receiving a portion of a workpiece, radially movable jaws, carried by the chuck body adjacent a front face and movable relative to the chuck body to grip the workpiece beyond said opening, means within the chuck body about said opening movable relative to the body for actuating said jaws, a passage within the chuck body transverse to and opening into said central opening and located in a segment of the chuck body between adjacent jaws, a member in said passage movable in the absence of a workpiece into said central opening at a location normally occupied by a workpiece gripped by the jaws, and means, with respect to which the chuck body is rotatable, sensitive to the position of said member in said central opening, to selectively permit or prevent work holder rotation.

4. A work holder as set forth in claim 3 wherein said means to prevent work holder rotation includes a control circuit and switch, arranged to prevent work holder rotation when said member is in said location, said passage acts as a conduit for fluid flow, said member controls flow through said conduit, and operation of said switch is responsive to fluid pressure in said conduit.

5. The combination as set forth in claim 4 further including a manifold movable into engagement with said chuck body to supply fluid under pressure to said conduit independently of the rotational position of the work holder.

6. A rotary work holder, comprising a chuck body adapted to be rotatably driven, a central opening in the body for receiving a portion of a workpiece, a movable jaw carried by the chuck body adjacent a front face and movable relative to the chuck body to grip the workpiece beyond said opening, means for actuating said chuck jaw, means defining a passage for carrying a flow of fluid in said body, means responsive to the presence of a workpiece in a portion of said opening for changing the flow characteristics of said passage, means movable in response to the supply of fluid pressure thereto and engageable thereby with the chuck body when the chuck body is stationary to supply fluid under pressure to said passage, and means sensitive to the fluid pressure within said passage to control rotation of said body.

7. A rotary work holder as set forth in claim 6 wherein said means responsive to the presence of a workpiece includes a movable obturating member in said passage positionable to selectively block the flow of fluid through said passage, and means engageable by a workpiece in said portion of said opening for controlling the position of said obturating member.

8. A rotary work holder as set forth in claim 7 wherein said obturating member and means engageable by a workpiece are interconnected and movable as a piston within said passage in response to a fluid pressure differential on opposite sides thereof to a first position that prevents fluid flow through the passage when said last-mentioned means engages a workpiece and to a second position that permits fluid flow through the passage when said last-mentioned means does not engage a workpiece.

9. For use in a machine tool, a rotary jaw chuck adapted to be supported by a spindle for rotation, and having a central opening for receiving a workpiece and work gripping jaws movable radially of said opening to grip the workpiece beyond said opening, a fluid passage in said chuck communicating with an outside surface thereof that is disposed transversely to the rotational axis of the chuck, means carried by said chuck to control fluid flow through said passage in response to the presence of a workpiece at a predetermined location in said central opening, an annular manifold adapted to be supported by a machine tool about the spindle with an annular face opposing said transverse surface of the work holder, a portion of said manifold being movable relative to another portion perpendicular to the plane of the annular face in response to the supplying of fluid pressure to the manifold, and means to supply fluid under pressure to said manifold, said annular face having at least one outlet for fluid to communicate with said fluid passage when said annular face is juxtaposed to said transverse surface.

10. Apparatus as set forth in claim 9 wherein said movable portion of the annular manifold has two concentric ring seals that project therefrom and establish a circular zone of fluid pressure opposite said transverse surface when the movable portion is extended from said another portion, the fluid passage opening through said transverse surface at a location between said concentric rings.

* * * * *